United States Patent [19]

Lindgren

[11] Patent Number: 4,550,600

[45] Date of Patent: Nov. 5, 1985

[54] LIQUID LEVEL GAUGE

[76] Inventor: Peter B. Lindgren, 4491 Crystal Lake Dr., Pompano Beach, Fla. 33064

[21] Appl. No.: 521,333

[22] Filed: Aug. 8, 1983

[51] Int. Cl.$^4$ .............................................. G01F 23/14
[52] U.S. Cl. ...................................... 73/299; 73/756; 137/558
[58] Field of Search ................ 73/290 R, 756, 299; 137/558

[56] References Cited

U.S. PATENT DOCUMENTS

| | | | |
|---|---|---|---|
| 1,797,591 | 3/1931 | Sartakoff | 137/558 |
| 3,102,427 | 9/1963 | Trostel | 73/756 |
| 3,693,738 | 9/1972 | Andrews | 73/299 |
| 3,943,760 | 3/1976 | Allen | 73/756 X |
| 4,305,284 | 12/1981 | Rybicki et al. | 73/302 |
| 4,355,658 | 10/1982 | Snyder | 137/557 |

*Primary Examiner*—Daniel M. Yasich
*Attorney, Agent, or Firm*—Joseph Zallen

[57] ABSTRACT

A device for determining the level of a liquid in a tank comprising a manually-operated spring-loaded piston in a piston chamber, wherein the chamber is connected to the tank and a gauge. Pressing the piston causes the gauge to reach the pressure at the bottom of the tank, which is calibrated to give the height or level of the liquid in the tank.

6 Claims, 5 Drawing Figures

LIQUID LEVEL GAUGE

BACKGROUND OF INVENTION

This invention relates to reading the liquid levels in tanks as for example, oil, water and diesel fuel tanks on a boat. In particular the invention relates to a reliable and efficient apparatus and method to read the liquid level of each of a plurality of tanks with a single pressure gauge.

Liquid level indicators have been described in the prior art. Representative of this prior art are the following U.S. Pat. Nos. 1,521,195, 1,526,376, 1,526,377, 2,003,759, 2,161,510 2,658,389, 3,262,313, 3,587,316, 3,613,456, 3,667,295, 4,167,874; and an article entitled "A Look At Level Measurement Methods", *Instructions' & Control Systems*, April 1981, Pages 37 to 45. This prior art includes static pressure level measurements and bubbler back pressure devices.

However, the liquid level gauges described in the prior art are generally not suitable for boats and in addition are complex and costly.

One object of this invention is to provide a simple apparatus and method for reading the liquid level in a plurality of tanks in a safe, reliable manner.

A further object of this invention is to provide such a method and apparatus which can be completely manually operated.

Other objects and advantages of this invention will be apparent from the description and claims which follow, taken together with the appended drawings.

SUMMARY OF INVENTION

The invention comprises generally a liquid level gauge which is manually operated, requires no external power, has a single moving part, and is safe and reliable for use with gasoline, diesel fuel, fresh water, and similar liquids. In its broadest form, the invention comprises a manually-operated spring-loaded piston operating in a chamber having connections to the liquid in the tank, the outside air, and the gauge. When the piston is depressed, the movement of the piston first purges the device of excess air under pressure and then forces the air into the tank until there is equilibrium, the operator reads the gauge while holding the piston depressed. The pressing of the piston causes the air to be compressed until it is at the same pressure as the liquid at the bottom of the tank, which is indicative of the level or height of the liquid in the tank, simple calibration being carried out for the particular size of the tank and the nature of the liquid. Release of the piston permits the duck bill valve to replenish ambient air in the system.

In its preferred form a plurality of piston-cylinder assemblies each connected to a different tank can be used, together with a single gauge. In this instance only one of the assemblies need have initial purging and a common connector is supplied to the single gauge.

The present invention requires no electrical or pneumatic power connections, and is hence particularly adaptable to marine applications. Since it requires no external power it cannot cause sparks and is more accurate than any electronic gauges or alarms. Typical dimensions for a control assembly of this invention are a length of about seven inches, and a width and depth of about five inches and a weight of less than two pounds for connection to four tanks. The device is operable at a distance of up to fifty feet from each tank.

The individual liquid tanks contain conventional filling and venting means. In utilising the present invention it is preferred that an additional safety device be used to prevent accidental spread of flaming or flammable liquid back to the control assembly. This can be accomplished by a connection containing a check valve.

SPECIFIC EXAMPLE OF INVENTION

Figure 1:
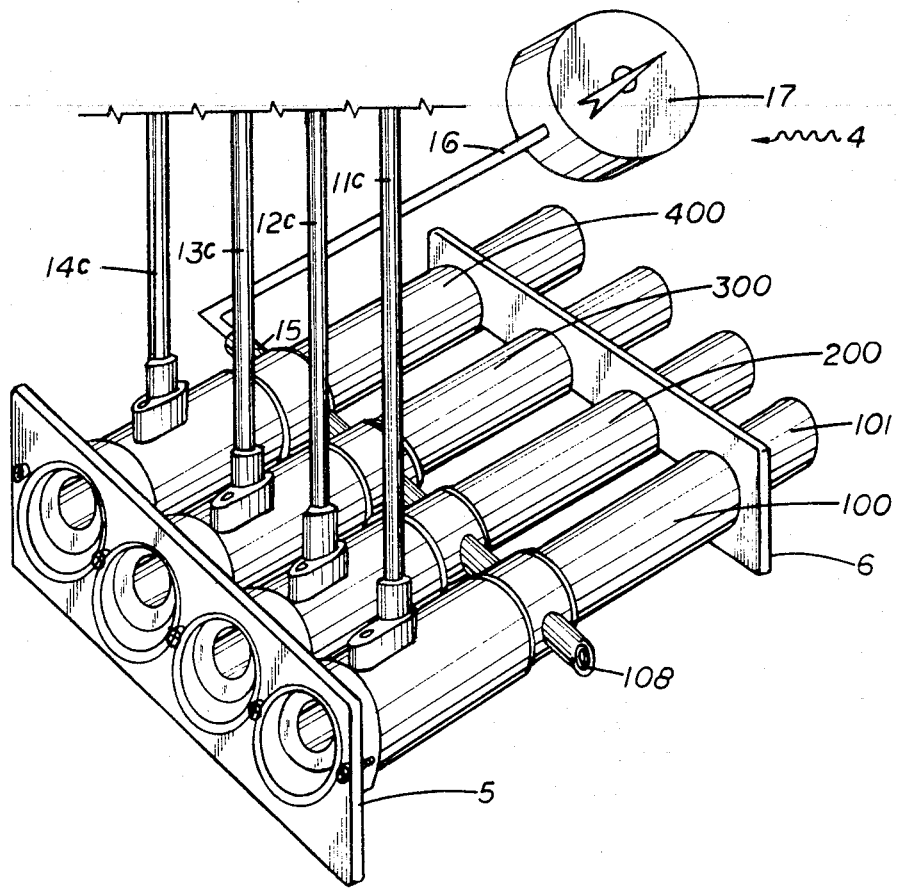
FIG. 1 is a perspective view of a control assembly of this invention, showing the pipes leading to the individual tanks (not illustrated.)
Figure 2:
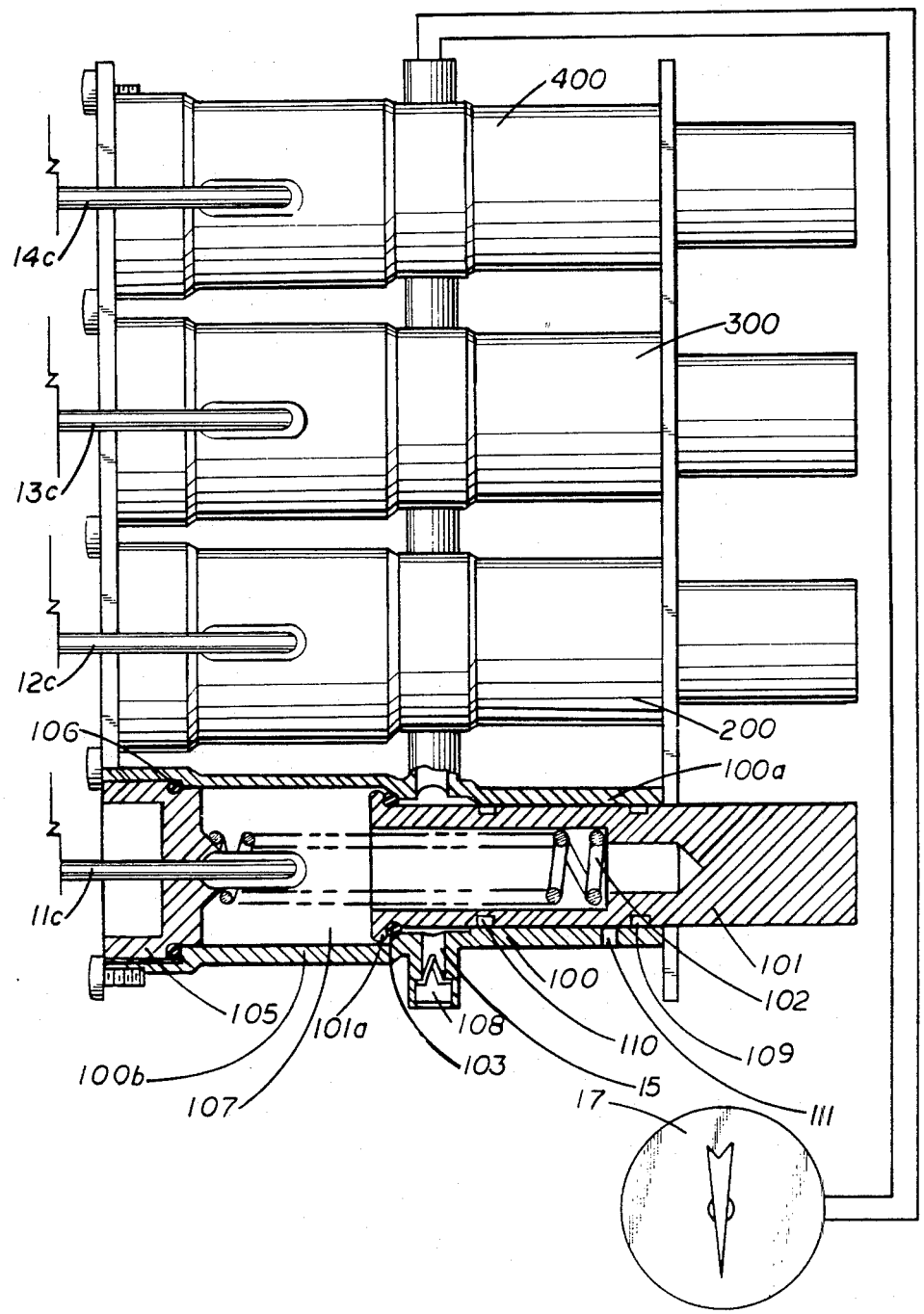
FIG. 2 is a diagrammatic cross section of the control assembly of FIG. 1.
Figure 3:
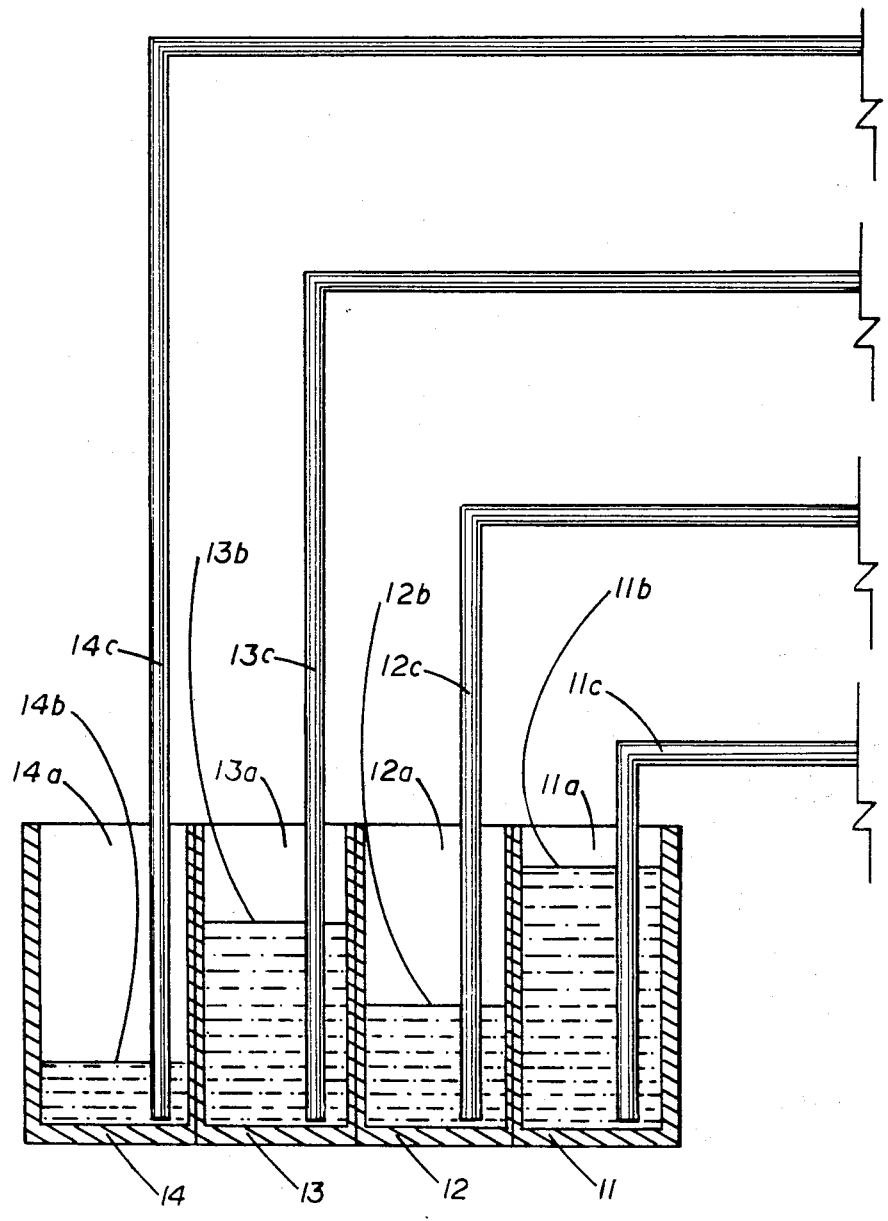
FIG. 3 is a diagrammatic cross section of four separate tanks whose liquid levels can be read by the control assembly.

Referring now to the drawings there is illustrated therein a control assembly 4 comprising frame members 5 and 6 which support valve assemblies 100, 200, 300 and 400. Extending from the valve assemblies are pipes 11c, 12c, 13c and 14c leading to tanks 11a, 12a, 13a and 14a respectively. Extending transversely through the valve assemblies is a passageway 15 which leads by tube 16 to pressure gauge 17. A check valve 108 is provided at the end of passageway 15.

The valve assemblies are similar in construction and will be described by reference to the construction of valve assembly 100. The valve assembly comprises a hollow body portion having a narrow portion 100a opening up into a slightly larger diameter portion 100b. Spaced within the body portion is a movable piston 101 having a notch for accommodating a piston spring 102 which extends between the piston and the piston cylinder cap 105 having an o-ring 106. Piston 101 has a shoulder 101a which holds an o-ring 103 and annular notches 109 and 110 containing piston seals. The body portion 100a has an air vent 111. Tank pipe 11c extends into the piston cylinder pressure cavity 107.

When the operator wishes to read the liquid level 11b in tank 11 he manually depresses piston 101 so that the o-ring 103 is lifted off its seat. This permits the piston cylinder pressure cavity 107 to be connected with the gauge conduit 15. The piston seal 110 moves past a step in the valve body 100 unsealing the conduit from vent hole 111. As the operator holds the piston 101 in this position any excess air pressure in conduit 15 will vent through vent hole 111 and gauge 17 will be calibrated to zero (this single calibration is sufficient for all the valve assemblies.)

As the piston seal 109 moves past the vent hole 111 air begins to be compressed in the piston cylinder pressure cavity 107, gauge conduit 15, pressure tube 16, gauge 17, and tank tube 11c. As the air pressure rises it pushes any liquid in 11c out until the pressure in 11c equals the pressure at the bottom of tank 11. Excess air bubbles out the top of the tank.

When the piston 101 is totally depressed and rests firmly on the cylinder cap 105 for a few seconds, all the transient pressures equalize and the gauge reads the pressure at the bottom of tank 11. (the reading can be scaled to volume for each specific tank).

When the operator releases the piston 101 the spring 102 returns it to its original position and check valve 108 opens to allow air to enter the system thus preventing any liquid from being sucked out of the tank into the system.

Figure 4:
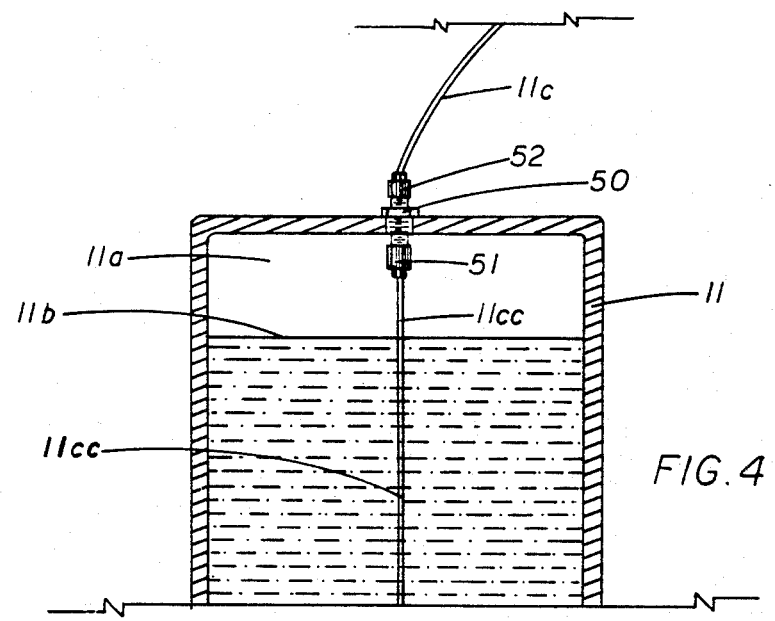
FIG. 4 is sectional view of a safety connection for the pipe from the control assembly into the tank.
Figure 5:
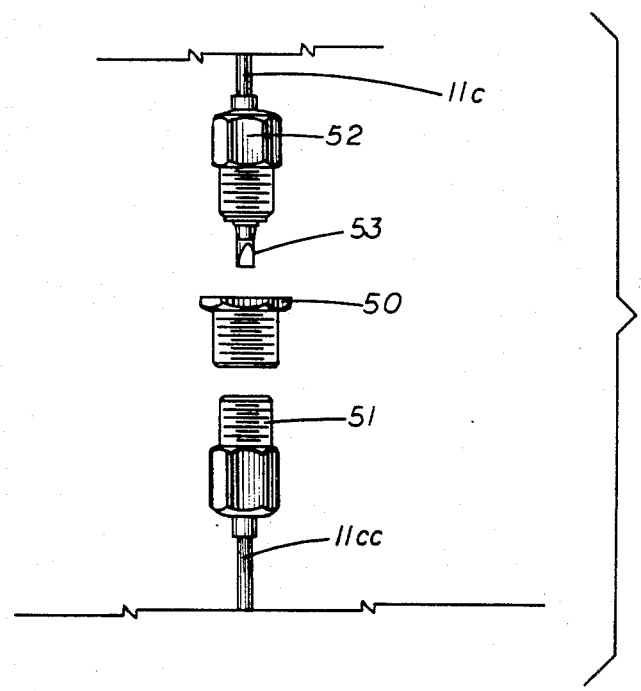
FIG. 5 is an exploded view of the connection of FIG. 4.

The individual liquid tanks have their normal filling and venting devices as may be required by safety regulation. In addition, as illustrated in FIGS. 4 and 5, the connection between the conduit 11c and the liquid tank 11 comprises a bushing 50 threaded through the top wall of the tank. The conduit 11c leading from the control assembly is connected to threaded fitting 52 which incorporates a check valve 53. Fitting 52 is connected to the outer opening of bushing 50 while the conduit 11cc in the interior of the liquid tank 11 (which goes to the bottom of the tank) has a threaded connection 51 which is connected to the inner end of bushing 50. The duck-bill check valve 53 is normally closed at all times and is open only when the piston is depressed. Upon release of the piston, the valve closes thus insuring that no liquid enters this system. This is particularly important where the liquid is flammable, such as fuel.

I claim:

1. A device for determining the level of liquid (11b) in a tank (11) comprising:
   (a) A piston chamber (107) having one closed end and one open end;
   (b) A piston (101) movable within said chamber and extending through said open end so as to be externally manipulable;
   (c) Spring means (102) between the inner end of said piston and said closed end of said chamber;
   (d) First conduit means (11c, 11cc) for providing a flow path for said liquid and for connecting the liquid in the tank (11) to the interior of said chamber (107) through a wall thereof;
   (e) An air-operated gauge (17);
   (f) Second conduit means (15) for connecting the interior of said chamber (107) and said gauge (17);
   (g) Means (103) carried by said piston for normally sealing off connection between the interior of said chamber and said first and second conduit means, but permitting connection between said chamber and said conduit means upon manipulation of said piston so as to press said piston inwardly; and
   (h) Check valve means (108) to the atmosphere in one end of said second conduit means (15).

2. The device of claim 1 wherein there are a plurality of combinations of a separate piston 101 and piston chamber 107 and a separate first conduit means (11c, 11cc); with all said chambers being connected to a single common second conduit means (15) leading to said gauge, (17), one said piston and piston chamber being operable at one time.

3. The device of claim 2 wherein means (111) are provided for venting said second conduit so as to calibrate said gauge.

4. The device of claim 2 wherein a said first conduit means includes check valve means (53) to prevent liquid in said tank from flowing into a said chamber.

5. The device of claim 1 wherein said first conduit means includes check valve means (53) to prevent liquid in said tank from flowing into said chamber.

6. The device of claim 1 wherein means (111) are provided for venting said second conduit so as to calibrate said gauge.

* * * * *